US007509518B2

(12) United States Patent
Bailey et al.

(10) Patent No.: US 7,509,518 B2
(45) Date of Patent: Mar. 24, 2009

(54) DETERMINING THE IMPACT OF A COMPONENT FAILURE ON ONE OR MORE SERVICES

(75) Inventors: Daniel Bailey, Portsmouth (GB); Charlotte Newton, London (GB); Gary Paul Noble, Near Broadway (GB); Maurice James Perks, Fleet (GB); Andrew Tinsley, Towcester (GB); Melissa Jane Tongue, Birmingham (GB)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 11/014,310

(22) Filed: Dec. 16, 2004

(65) Prior Publication Data

US 2005/0144188 A1 Jun. 30, 2005

(30) Foreign Application Priority Data

Dec. 16, 2003 (GB) ................. 0329046.7

(51) Int. Cl.
*G06F 11/00* (2006.01)
(52) U.S. Cl. .................. 714/1; 707/101; 707/202
(58) Field of Classification Search ............... None
See application file for complete search history.

(56) References Cited

U.S. PATENT DOCUMENTS

| 5,132,920 | A | | 7/1992 | Bellows et al. | |
|---|---|---|---|---|---|
| 5,161,158 | A | | 11/1992 | Chakravarty et al. | |
| 5,872,911 | A | * | 2/1999 | Berg | 714/43 |
| 6,434,628 | B1 | * | 8/2002 | Bowman-Amuah | 714/48 |
| 6,446,123 | B1 | * | 9/2002 | Ballantine et al. | 709/224 |
| 6,745,210 | B1 | * | 6/2004 | Scanlan et al. | 707/204 |
| 6,901,347 | B1 | * | 5/2005 | Murray et al. | 702/182 |
| 7,036,041 | B2 | * | 4/2006 | Akamatu et al. | 714/6 |
| 2001/0047495 | A1 | * | 11/2001 | Kettley et al. | 714/2 |
| 2004/0049509 | A1 | * | 3/2004 | Keller et al. | 707/100 |
| 2005/0149484 | A1 | * | 7/2005 | Fox et al. | 707/1 |
| 2006/0136327 | A1 | * | 6/2006 | You | 705/38 |

FOREIGN PATENT DOCUMENTS

| CA | 2312653 A1 * | 11/2001 |
|---|---|---|
| GB | 2194086 A | 2/1998 |
| WO | WO 01/79994 A2 | 10/2001 |

OTHER PUBLICATIONS

B. Bahlmann, "Before the Customer Calls: Problems with Network Maintenance." Communication Technology, Oct. 2000.
"Knowledge-based Dynamic Scheduler in Distributed Computer Control," IBM Technical Disclosure Bulletin, vol. 33, No. 1A, Jun. 1990, pp. 80-84.

* cited by examiner

*Primary Examiner*—Apu M Mofiz
*Assistant Examiner*—Hung D Le
(74) *Attorney, Agent, or Firm*—Schmeiser, Olsen & Watts; William H. Steinberg

(57) ABSTRACT

The invention provides a method for determining the impact of a failure of a component on one or more services that the component is supporting. The method receiving a data feed from a processing node, the data feed containing data indicative of the identity and system status of a component running on the processing node; in response to the identity of the component, first determining if the component supports one or more services; identifying the temporal activity of the one or more services and, in dependence on the determining step, second determining the impact of the system status on the one or more services.

9 Claims, 7 Drawing Sheets

FIG. 3

| | FIG. 3A |
|---|---|
| | FIG. 3B |

330

| | | SCHEDULE | MONDAY 2 | | | | | | TUESDAY 3 | | | | | |
|---|---|---|---|---|---|---|---|---|---|---|---|---|---|---|
| SUB-PROCESS | BRT | | 0-4 | 4-8 | 8-12 | 12-16 | 16-20 | 20-24 | 0-4 | 4-8 | 8-12 | 12-16 | 16-20 | 20-24 |
| CONTRACT MANAGEMENT | 6 | 06:00-18:00 | | | | | | | | | | | | |
| CREDIT MANAGEMENT | 8 | 06:00-18:00 | | | | | | | | | | | | |
| ORDER ENTRY | 4 | 06:00-18:00 | | | | | | | | | | | | |
| ORDER SCHEDULING | 4 | 06:00-18:00 | | | | | | | | | | | | |
| RESCHEDULING BATCH | 8 | 18:00-23:59 | | | | | | | | | | | | |
| | | 00:00-07:00 | | | | | | | | | | | | |
| | | 00:00-08:00 | | | | | | | | | | | | |
| | | 00:30-09:30 | | | | | | | | | | | | |
| | | 15:00-23:59 | | | | | | | | | | | | |
| | | 16:00-23:59 | | | | | | | | | | | | |
| DROP DELIVERY | 1.5 | 07:00-17:00 | | | | | | | | | | | | |
| DAILY REPORTS | 1.5 | 01:00-07:00 | | | | | | | | | | | | |
| SHIP CONFIRMATION | 6 | 06:00-23:59 | | | | | | | | | | | | |
| BILLING | 8 | 11:30-18:00 | | | | | | | | | | | | |

FIG. 3A

DETERMINING THE IMPACT OF A COMPONENT FAILURE ON ONE OR MORE SERVICES

FIELD OF THE INVENTION

The invention relates to the field of systems management and in particular to a method and a system for determining the impact of a failure of a component on one or more IT services that the failed component is supporting.

BACKGROUND OF THE INVENTION

Providers of information technology (IT) services are increasingly faced with a demanding, competitive environment in which end users continually expect to be provided with, not only high quality services, but IT services which are available when the user needs them. This has led to providers of IT services ensuring that their IT services are available for use 24 hours a day, 7 days a week and 365 days of the year, in order to meet the demands of their users. If a user is repeatedly faced with IT services that are not available, the end user will soon take their business elsewhere.

The term IT services may comprise many different types of services available to a user for example, on-line banking, an on-line auction system, a payroll management system, a time recording system, a data backup service, or any other type of applications that may be provided by a service provider. Further IT services may comprise core IT services for example data backup, replication of data, producing daily reports and any other type of service that a business needs to be able to carry out its daily activities.

All IT services are supported by information technology systems which may cover the design, development, installation and implementation of IT systems and associated applications, for example, core services such as data backup and replication in order to operate effectively. Each IT system providing an IT service may comprise a plurality of software or hardware components, which may be deployed across a number of different servers and distributed across different geographical regions.

IT service providers offer services to perspective customers that must meet the requirements set down in a service level agreement (SLA). A service level agreement sets down the terms and conditions that shall be met when providing a particular service. For example, the scope of the service to be offered, performance, tracking and reporting, problem management, warranties and remedies, intellectual property rights and confidential information etc.

Often an end user complains of poor customer satisfaction because from the perspective of the end user, the IT service is not available when needed or the IT service gives poor performance at key times of the day. For example, if each employee in a workplace is required to record their worked hours by 3:00 pm each Friday, the time recording system will experience a heavier than normal amount of network traffic logging onto the system. If an IT component fails that is critical to the time recording system then the impact to the business is also critical. Alternatively, from the viewpoint of the service provider the impact of poor performance varies depending on the date and time at which the IT service is running. For example, a user may only log onto a time recording system at 3:00 pm on a Friday afternoon and continually experience poor performance. Therefore from the perspective of the user, the time recording system continually exhibits poor performance. From the service providers viewpoint the impact of poor performance may only be noticed at 3:00 pm on a Friday, because for the rest of the week, the time recording service exhibits a high level of performance due to low user usage.

In order to provide high quality IT services, it is vital for service providers to understand a customer's business and the impact that a failure of a component will have on a particular business requirement. For example, the impact of users not being able to record their work time, as the impact may not only affect the time recording service, but also may have a down stream impact on other IT services that may either be supported by the failed component or the IT service can not start because the service is reliant on the time recording service completing before it can start.

Traditionally users have viewed IT services as a single entity that has a binary state i.e. the IT service is working and available for service or is not available, and therefore the failure of any component that supports that IT service has a similar weight i.e. working or not working. This is often not the case, as a customer's business is made up of many IT services deployed across different components and the IT services may have different availability requirements.

WO 01/79994 describes a business process engine which hosts the execution of electronic business processes and generates event objects for communicating the state of the business process to a business rule engine. The business rule engine hosts the execution of business rule functions triggered dynamically in response to the event object. A business management engine hosts the generation of business reports reflecting system status.

However, this approach has disadvantages because the relationships between a component such as a piece of software or hardware and the IT service that is using that particular component is not identified and therefore a true representation of the availability and criticality of an IT service can not be achieved for any given time period.

OBJECTS AND SUMMARY OF THE INVENTION

Viewed from a first aspect, the present invention provides a method for determining the impact of a failure of a component for one or more services that the component is supporting, the method comprising the steps of: receiving a data feed from a processing node, the data feed containing data indicative of the identity and system status of a component running on the processing node; in response to the identity of the component, first determining if the component supports one or more services; identifying the temporal activity of the one or more services and, in dependence on the determining step, second determining the impact of the system status on the one or more services.

Advantageously, the present invention allows service providers to understand the relationships between a failure of a component and the impact that the failure has on one or more services that the component is supporting. The present invention allows a service provider to not go to the expense of service availability 24 hours a day, 7 days a week, 365 days a year, as the service provider can determine when a user needs a service and when they don't. Further, service providers are able to perform upgrades of their systems without impacting availability of other services.

Preferably the present invention provides a method wherein the identifying step further comprises performing a lookup in a calendar function to identify the temporal activity of the one or more services. The calendar function provides an input mechanism for mapping the temporal activity of each of the services. By analysing and mapping the behaviour of the IT service the daily activity of the IT service can be seen and allows the IT service providers with a projected view into the criticality of their IT services.

Preferably the present invention provides a method, wherein the temporal activity of the one or more services forms one or more rules for use in a rules engine to determine the relationship between the component and the one or more services.

Preferably the present invention provides a method wherein the determined relationships further comprise one or more relationships between services which are dependent on one or more other services.

Preferably the present invention provides a method, wherein the system status of a component identifies whether the component has failed or is active.

Preferably the present invention provides a method wherein in response to identifying that a component has failed, determining the length of time that it will take to rectify the fault and the time in which the component must start to be recovered in order support a scheduled service.

Preferably the present invention provides a method, wherein the result of the determining step produces a list of results identifying each component that has failed and the time period in which each failed component must be recovered.

Viewed from a second aspect, the present invention provides a system for determining the impact of a failure of a component for one or more services that the component is supporting, the system comprising the steps of: means for receiving a data feed from a processing node, the data feed containing data indicative of the identity and system status of a component running on the processing node, in response to the identity of the component, first means for determining if the component supports one or more services; means for identifying the temporal activity of the one or more services and, in dependence on the means for determining step, second means for determining the impact of the system status on the one or more services.

Preferably the present invention provides a system, wherein means for identifying further comprises means for performing a lookup in a calendar function to identify the temporal activity of the one or more services.

Preferably the present invention provides a system, wherein the temporal activity of the one or more services forms means for one or more rules for use in a rules engine to determine the relationship between the component and the one or more supporting services.

Preferably the present invention provides a system wherein the determined relationships further comprise one or more relationships between services which are dependant on one or more other services.

Preferably the present invention provides a system, wherein the system status of a component identifies whether the component has failed or is active.

Preferably the present invention provides a system, wherein in response to identifying that a component has failed, means for determining the length of time that it will take to rectify the fault and the time in which the component must start to be recovered in order support a scheduled service.

Preferably the present invention provides a system, wherein the means for determining time includes means for producing a list of results identifying each component that has failed and the time period in which each failed component must be recovered.

Viewed from a third aspect, the present invention provides a computer program product directly loadable into the internal memory of a digital computer, comprising software code portions for performing, when said product is run on a computer, program steps to carry out the invention.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
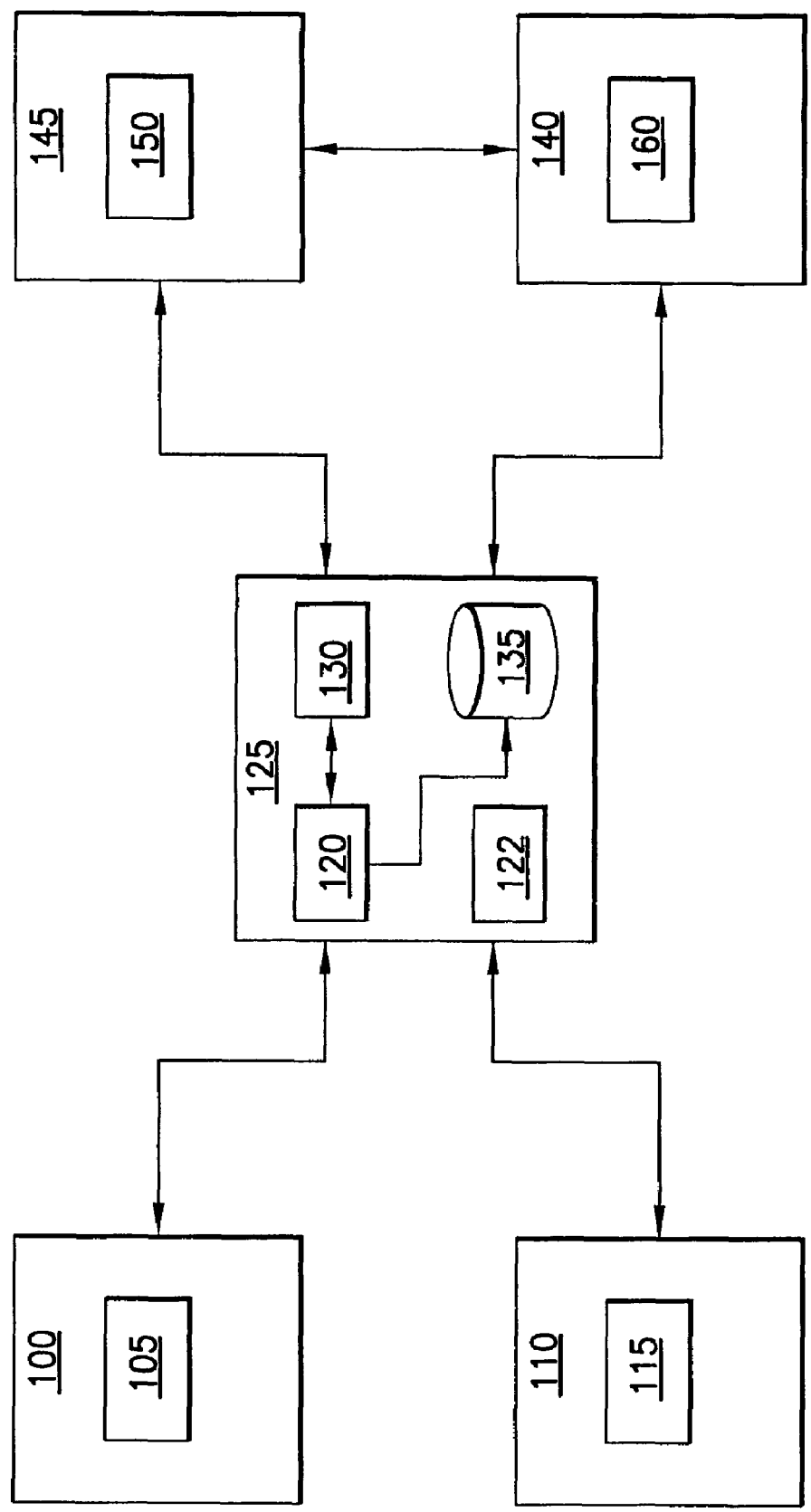
FIG. 1, is a data processing system in which a preferred embodiment of the invention may be implemented.

Where reference is made in any one or more of the accompanying drawings to steps or features which have the same reference numerals, those steps or features have substantially the same function(s) or operation(s) for the purposes of this description.

FIG. 1 shows a number of components of a data processing system, in which the invention can be advantageously applied. The data processing system comprises a number of application servers 120, 150, and 160 running on processing nodes 125, 145, 140 that are connected for communication with one or more user computer's 100 and 110.

The processing nodes 125, 140, 145 may be any data processing apparatus which is capable of running an application server, directory server or similar server program. Software-implemented elements of the embodiments described in detail below are not limited to any specific operating system or programming language.

Processing node 125 comprises a reprioritization component 130 for interfacing with a monitoring system 122. The reprioritization component 130 receiving real time data feeds from the monitoring system 122. The real time data feeds comprising the name of the component, the IP address of the component and the status of the component, for example, the component has 'failed', or the component is 'available'. In response to the information within the real time data feed and further statistical data collected by the reprioritization component 130 (explained below), an assessment is performed to determine the impact of a component failure on one or more IT services.

In another embodiment a data feed may comprise information regarding the performance of a processing node or component. For example, the processing node has developed 2 faults in the last 3 days and has experienced down time of 5 hours as a consequence.

Reprioritization component 130 may be implemented as a computer program using any programming language that is suitable for use within a distributed environment.

Processing nodes 125, 140, 145 may run any type of operating system and any type of applications that are able to serve requests from other client or servers located within the data processing system. For example, processing nodes 125, 140, 145, may be running applications that are supporting a customer business, such as a time recording service or a credit checking service.

Processing node 125 further comprises a non-volatile data store 135 for storing configuration data about each processing node 125, 140, 145, the temporal nature of each IT service, the results of an impact assessment and the data feeds received from the monitoring system 122. The data store 135 may comprise any suitable archive and retrieval mechanism, for example, a relational database or an XML database. The configuration data may be stored in one single data store or a plurality of data stores depending on the architectural requirements of the data processing system.

Users' computers 100 and 110 may comprise an interface 105 and 115, for inputting data into reprioritization component 130. The interface may further comprise display means for displaying the output of an impact assessment, a schedular view displaying the activity and criticality of one or more IT services and a view of the current system state of one or more IT Services.

User's computer 100, 110 is not limited to a particular type of data processing apparatus, and may be a conventional desktop or lap-top personal computer, a personal digital assistant (PDA) or other specialized data processing device which is capable of running an application program. The user's computer may connect to a network of data processing systems via wireless or hard-wired connections. Communication between user's computers 100, 110 may be carried out over a network such as a local area network, a wide area network or across the Internet. Each of user's computers 100, 110 and processing nodes 125, 140, 145 may be remote from each other within the network.

In an example embodiment, processing nodes 145 and 140 are providing a plurality of IT services. For example, an application server may be providing a credit checking service for a particular customer and a time recording process for another customer. Alternatively processing nodes 145 and 140 may be providing core IT services such as producing daily reports or a replication service.

An IT service may be distributed across a plurality of processing nodes. For example, a distributed database serving data to multiple geographically dispersed web sites. For each of these examples there may be common hardware or software components which are supporting the credit checking service, the time recording process or the geographically dispersed web sites. Therefore, it can be seen that there is not a one to one relationship between a hardware or software component and an IT service, but in fact many components may support many IT services i.e. a many to many relationship.

The impact of a component failure may depend not only on which component has failed and which IT service is impacted but also the implementation of the IT service. For example, a particular component/service combination deployed by a particular company when interrupted by a component failure may result in a different impact when deployed by different company. For example, when deploying a supply chain management service, one of the failed components used to deploy this service may be a DB2 database. For company 'A' the predicted recovery time for the component failure may be 4 hours, while for company 'B', the predicated recovery time for the same component may by 8 hours. The predicted recovery time for company 'B' may be longer due to a high volume of data input into the service.

In order to provide users with a particular level of service, it is an important requirement for any system operations manager to understand the relationships between a component and the IT services that it may support. This enables component upgrades to be performed, system outage time to be minimized and IT service problems to be reported and rectified in the quickest possible time.

Figure 2:
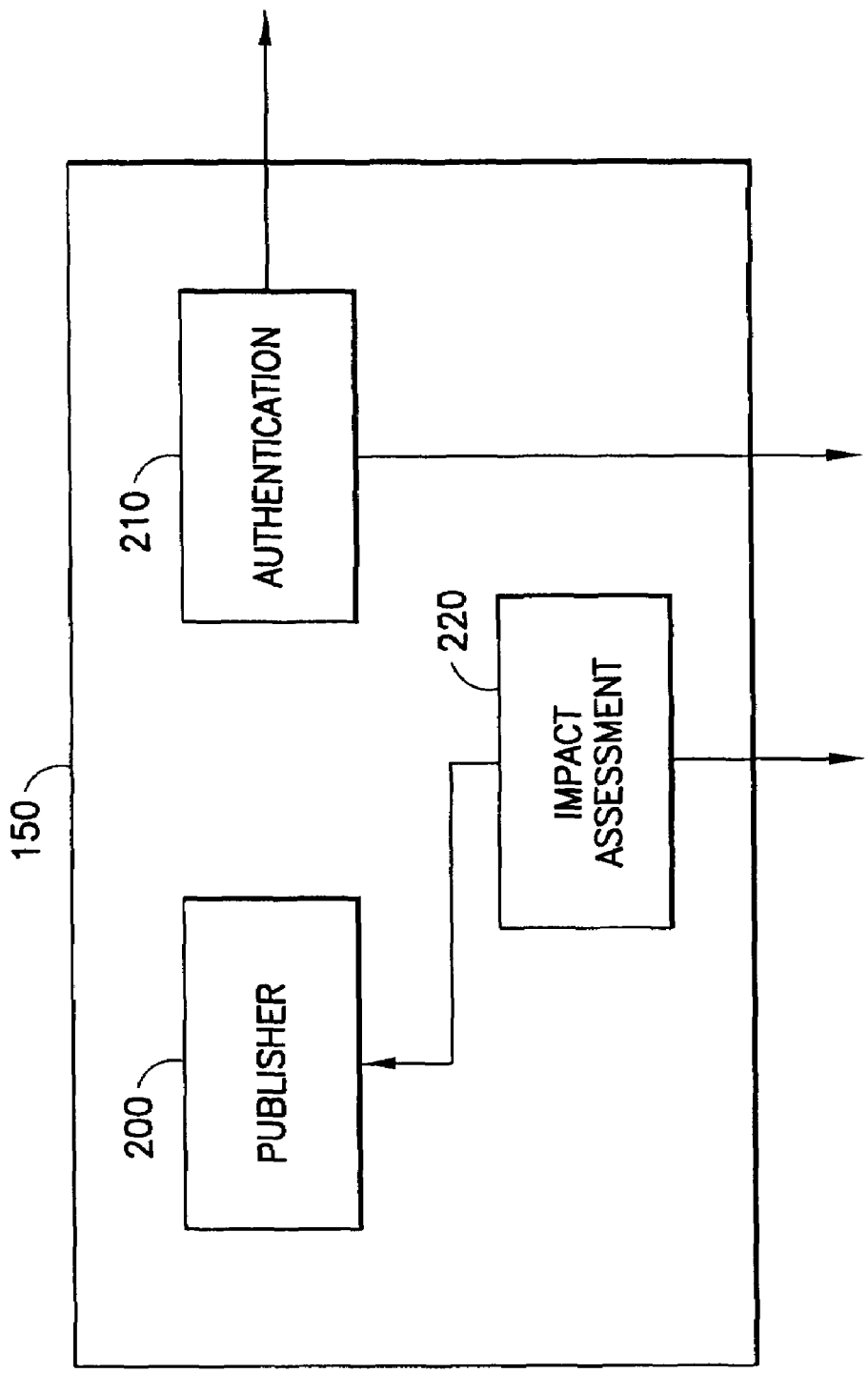
FIG. 2 illustrates the reprioritization component according to a preferred embodiment of the present invention.

Referring to FIG. 2, the reprioritization component comprises the following components, publisher component 200 for collating and displaying information gathered by the system, authentication component 210, for authenticating one or more data feeds received from the monitoring system and impact assessment component 220 for determining the impact on a component of disruption from its normal operation on one or more IT services. Each one of these components will now be explained.

The publisher component 200 provides an interface for receiving one or more data inputs from user's computer 100, 110 and displaying one or more outputs of reprioritization component 130.

In order for the system to be able to perform an impact assessment, the system requires data from a number of sources. One particular source is data regarding the temporal nature of an IT service. A service exhibits different behaviour at different times of the day, month and year, depending on the requirements of the users using the services. For example, using an example of a time recording service, the users of the time recording service may record their work hours at 15:00 on a Friday afternoon. This requirement is dictated by the users of the time recording service. Similarly, towards the end of a financial year, an expense reporting service may experience heavier use by users than at other times of the year. Therefore, the temporal activity of a service may comprise the days and times of when the service should be running and when the service must run because of the need to have the service working when the users need it most. Further, the criticality of the service (which describes the level of importance attributed to the service being available and is defined by an amount of time or permissible disruption to normal operation) may vary for indirect reasons. For example, a customer relationship management service for a sales force may become more critical at the time a new product is launched.

The temporal activity of an IT service is mapped into a scheduler function. The scheduler function comprises the ability for the temporal activity of an IT service to be mapped against minutes, hours, days, months and years.

Figure 3B:
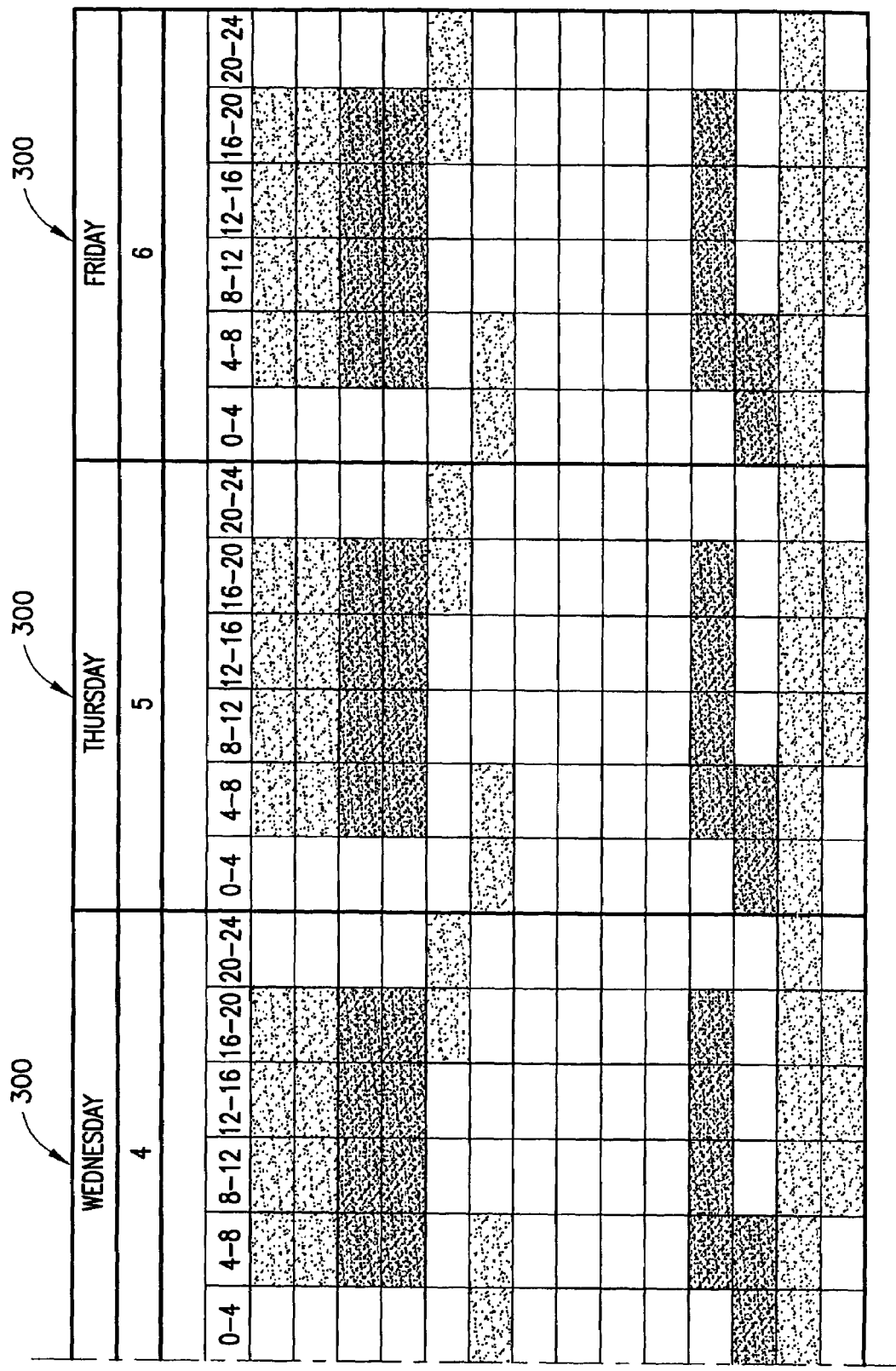
FIG. 3 illustrates the output of the reprioritization data into a graphical user interface of the impact assessment module of FIG. 2 according to a preferred embodiment of the present invention.

Referring to FIG. 3 which depicts a table, the mapping of a number of IT services can be seen within the calendar function. The activity of the IT service is broken down into the temporal activity of IT service 310 over each day of the week 300. For example, IT service contract management 330 must run Mondays to Friday between the hours of 04:00 to 20:00 hours. In contrast, IT service daily reports 315 must run Monday to Friday but only between the hours of 01:00 and 7:00 hours.

Each IT service mapped into the calendar function may further be categorized by its level of criticality. For example, contract management IT service 330 may be further categorised into a particular color band which signifies in the event of a component failure that it is 'important' 325 that the IT service runs at a particular time of the day.

Similarly if the IT service is categorised as 'critical' 320 then a further color banding may be used to signify this status.

Each time, impact assessor 220 calculates the impact of a failure of a component on the one or more IT services that it supports, the criticality of each IT service may be dynamically viewed over a period of time. The calendar function is therefore a store for the changing criticality of an IT service which is dynamically updated by the reprioritization component 120.

The calendar function enables time zones of different countries to be managed. For example, a help desk agent working in the UK, who is talking to a user in Germany and whose system, is being maintained in the US. Each different user involved in this example will require the same information, but adjusted to their own time zone.

The calendar function further provides a dynamic view of one or more IT services over a period of time, displaying the criticality of an IT service as it is affected by one or more component failures. For example, a component may fail that affects a time recording process. The component has failed at 14:00. A failure of the component at 14:00 is deemed not to affect the time recording process and is displayed in the scheduler as an amber failure. It is critical that the time recording process is available for use at 16:00, therefore as the current time moves closer to 16:00 and the component failure has not been fixed the IT service may be displayed as red, signifying a critical failure. If the failure of a component is not deemed to affect an IT service at a particular point in time, a calculation is performed to determine to identify when the IT service would be considered at risk.

The temporal activity of each of the IT services that a component is supporting is stored in data store 135. For example, table 1 illustrates the temporal nature of a time recording process.

TABLE 1

| Service | Should run | Must run | Critical |
| --- | --- | --- | --- |
| Time recording | Monday 6:00 to Thursday 17:00 | Friday 8:00 to 12:00 | Friday 12:00 to 17:00 |

The temporal activity stored for each IT service, therefore forms one or more rules for each IT service, which can be propagated down through the use of a rules engine, to all the processing nodes within the data processing system. For example, the day is Monday and the time is 12:00, according to Table 1, this means that the time recording process 'should run'. Using a further example, the day is Friday and the time is 13:00, therefore according to Table 1, the time recording service is classified 'as critical'. Each of these rules can be defined in a rules engine within impact assessor 220. As each of the data feeds are received by impact assessor 220, the rules engine can define the criticality of each of the IT services supported by a component that has failed or developed a fault.

Once the temporal nature of an IT service has been defined, the results from the rules engine are mapped to the components that support the one or more IT services.

For example,
Payments to Canada—<needs hardware component X, software component Y—to run>
Payments to USA—<needs hardware component X, software component Y—to run>

The mapping may be carried out by populating an XML schema. The XML schema may comprise the following IT service→components→nodes. Therefore failure of nodes and component may be monitored and propagated back up to the IT service that they are supporting.

Figure 4:
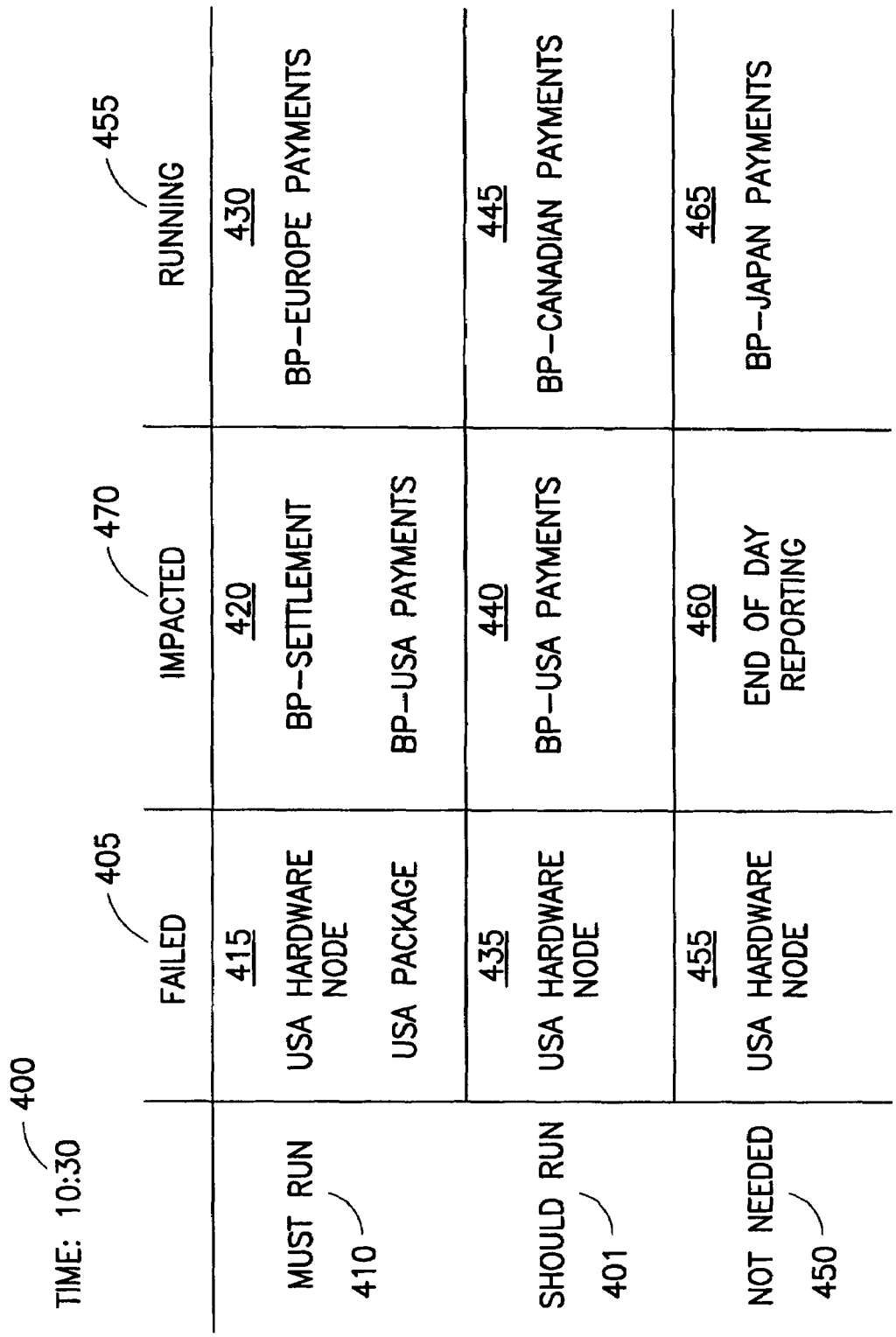
FIG. 4 illustrates a component failure and the impacted IT services at a given point in time according to a preferred embodiment of the present invention.

Referring to FIG. 4, the impact of a component failure can be seen in relation to a number of IT services at a given point in time 400 i.e. the illustrative time in FIG. 4, being 10:30. Each IT service is categorised into 'must run' 410, 'should run' 401 and 'not needed' 450. Once a data feed has been received of a component fault of failure that impacts its normal operation, the component that has failed or developed a fault is displayed in the 'failed' column 405.

Therefore it can be seen that the USA hardware node 415 and USA package 415 has failed. This in turn impacts 470, the settlement service 420, and the USA payment service 420. The most important of these services, is the European payments which is running 430 but as of yet not impacted.

Equally, it can be seen that at 10:30 400 the services that should run 401 is the USA payment service 440. This service is also impacted by the failure of the USA hardware node 435. Further at 10:30 the Canada payment service 445 is running and may be impacted by the USA hardware node failure.

Further, in the 'not needed' row 450, it may that the USA Hardware node 455 is categorised as 'not needed'. Therefore if the 'end of day reporting' 460 is the only IT service that is impacted or the 'Japan payment' service 465 is running, then it is possible for a systems operation manager to perform a system outage operation. Hence it is possible to understand which components are supporting one or more IT services and in the event of a component failure, take the most appropriate remedial action.

By understanding the relationships between a failure of a component and the one or more IT services that it supports the effect of the impact may be understood. For example if service X runs at 10:00 and takes 2 hours to complete, it may be that services X and Y can only run after service X had completed. Therefore the 'knock on effect' of failure or delayed running may be understood.

Information regarding each component residing on a processing node may be gathered by a configuration management system. As is known in the art, configuration management identifies how various IT components (e.g., hardware, software, service-level agreements, documentation, databases, policies and procedures) are linked together within an IT environment, for example, a workstation 'X' has an operating system installed of a particular time and a number of other software applications.

The configuration management system allows the tracking of a processing node's 135 hardware and software configuration including physical and logical network information and administrative information such as personnel information and location information, etc. To enable configuration data to be extracted from each processing node within a data processing network, as is known in the art, a configuration agent is installed on each processing node. The processing node may be a client computer or a server computer running a variety of software applications.

The configuration agent extracts the configuration data in the form or a flat file. This file is sent to an importer agent (not shown) installed on a server. The importer agent extracts the configuration data from the flat file and writes the configuration data to a data store. SQL queries can be performed on the configuration data, stored in a data store (not shown).

The configuration data gathered from each processing node may comprise detailed listings of the hardware and software installed on each processing node. An example of a configuration listing for a processing node is as follows:

| | |
|---|---|
| Server serial number: | 78XXB31 |
| Operating system (OS): | AIX |
| OS version number: | 5 |
| Applications: | Transaction verification V2.6 |
| | Risk engine - high risk V8.91 |

The configuration data for each processing node is stored in an XML schema. The configuration data defined within the XML schema listing each hardware and software component of a processing node. The XML schema is modified to further comprise the name of the IT service that a component is supporting, and the process start time, and when the IT service should be running, and when it is critical that it is running.

The publisher component is also responsible for providing an input and output interface for simulation of the impact that a component failure has on an IT service. The user is able to enter commands into the interface to simulate certain scenarios. For example, it may be necessary to upgrade a particular hardware component and therefore, it is vital to understand which IT services the hardware component is supporting. The presentation component is able to display the calculated impact assessment to the user.

Turning now to monitoring component 122, monitoring component 122 receives one or more data feeds from one or more processing nodes. The monitoring component may 'ping' the one or more processing nodes every predetermined number of seconds to determine whether a component is running or has developed a fault. A 'ping' requires the requesting processing node to request the IP address of the receiving processing node. For example, Ping www.ibm.com may return the IP address 127.0.0.1 and the following information.
 Pinging www.ibm.com [129.42.18.99] with 32 bytes of data:
 Reply from 129.42.18.99: bytes=32 time<1 ms TTL=128
 Reply from 129.42.18.99: bytes=32 time<1 ms TTL=128
 Reply from 129.42.18.99: bytes=32 time<1 ms TTL=128
 Reply from 129.42.18.99: bytes=32 time<1 ms TTL=128
 Ping statistics for 129.42.18.99:
 Packets: Sent=4, Received=4, Lost=0 (0% loss),
 Approximate round trip times in milli-seconds:
 Minimum=0 ms, Maximum=0 ms, Average=0 ms
The above information indicates that the processing node or component is active. If the processing node or component was not active the following may occur
 Reply from 129.42.18.99: bytes=32 time<1 ms TTL=128
 Reply from 129.42.18.99: bytes=32 time<1 ms TTL=128
 Ping statistics for 129.42.18.99:
 Packets: Sent=4, Received=0, Lost=4 (100% loss),
 Approximate round trip times in milli-seconds:
 Minimum=0 ms, Maximum=0 ms, Average=0 ms In the above example, it can be seen that the number of packets sent were 4 and that the receiving machine did not receive the 4 packets and hence all 4 packets were lost, indicating a failure of the processing node or component.

Alternatively processing nodes, hardware or software running on a processing node that does not have an IP address, a VTAM command may be used to return the status of a component. Other means for obtaining information concerning the status of a component comprise parsing application logs and operating system logs. In another embodiment a publish subscribe mechanism may be used to publish specific information that is required from one or more processing nodes.

The data feeds comprise information regarding the processing nodes host name, the processing nodes IP address, the name of the component that is supporting the IT service and information regarding the state of the component, for example, state=running, or state=failed. The monitoring component routes each of the received data feeds onto the authentication component.

Turning now to authentication component 210, authentication component 210 ensures that a data feed which is received from the monitoring component is a valid data feed and that a user who is logged on to the impact assessor is a valid user. The validation of a data feed requires the authentication component to perform a look up in a data store to locate if the IP address of a processing node is a registered IP address. The authentication component further detects that the data feed carries an authentic user name and password otherwise the data feed with be returned to the requesting client device 100, 110 or processing node 140, 145.

Once the data feed has been authenticated it is sent to impact assessor component 220. If it is identified in the data feed that a component has developed a fault, the impact assessor component collates for each component identified in the data feed information regarding the one or more IT services that it may be supporting. Table 2 is an example of the type of data that may be retrieved from data store 135.

TABLE 2

EMEA Order Fulfillment,
Ship Confirmation (a), BRT: 8.00 hrs, Criticality: Important
Start Date: 00:00 May 12, 2003, End Date: 23:59 May 12, 2003,
impact = Data

| Component | Location | Host | Type |
|---|---|---|---|
| H5Router | | | Fault |

Using the data within Table 2, a data feed may be received from the authentication component indicating that the H5Router has developed a fault. A look up is performed in data store 135 to locate the IT service that the component is supporting. In this example, the IT service is the EMEA Order Fulfillment. Further information is retrieved concerning the business recovery time, the criticality, the start date and start time, the end date and end time (Fatal, Data, Performance) of the running of the EMEA Order Fulfillment service.

Further information may be retrieved from data store 135 to indicate when key milestones are met by an IT service. For example starting bulk payment at 18:00 hours and completed bulk payment at 19:01 hours. Thus allowing the monitoring of an IT services success due to completion times.

Once the above data has been gathered, impact assessor component 220 begins to calculate the latest time in which a component must be replaced, repaired or updated, in order to minimize the impact on one or more IT services.

Figure 5:
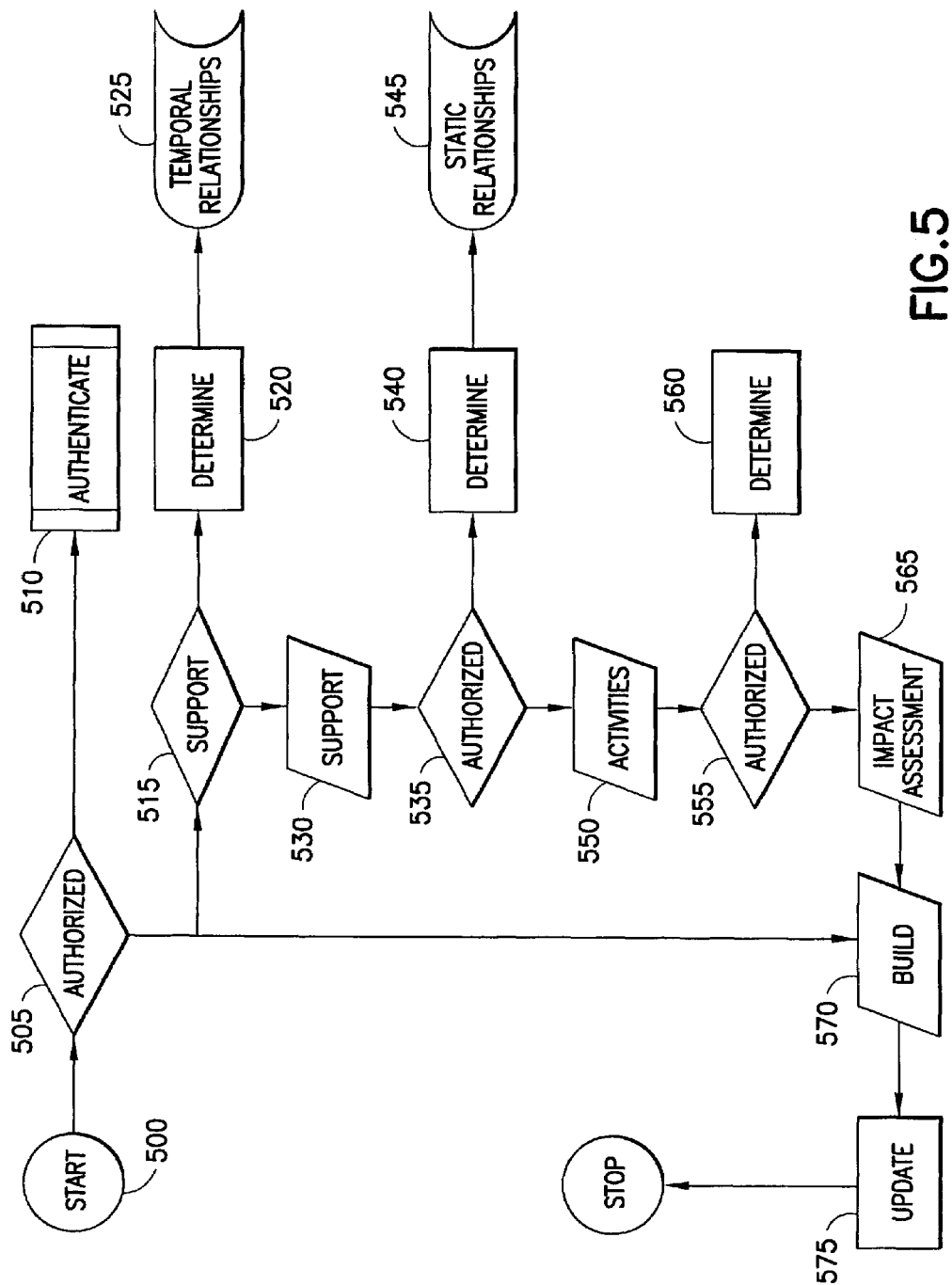
FIG. 5 shows the steps that the event reprioritization system performs in order to asses the impact on one or more IT services of a component failure according to a preferred embodiment of the present invention.

Referring to FIG. 5, the steps the impact assessor performs in order to create an impact assessment are explained:

At step 500 a data feed is received by the authentication component from a processing node. The authentication component parses the data feed to determine whether the data feed is a valid data feed at step 505.

Alternatively, at step 500, the user may issue instructions from user's computer 110, 110 requesting a simulation to be carried out on the impact of an IT service on one or more components failing. The authentication component receives the instructions in the form of a data feed and authenticates the data feed to ensure that the data feed is a valid data feed at step 510.

Once the data feed has been authenticated, a determination step is performed at step 520, to establish whether the component is supporting an IT service. A query is performed in the data store at step 520 to determine which IT service the component is supporting 525. A list is retrieved from the configuration database detailing each of the IT services that the component is supporting (please refer to Table 2).

Returning to step 515, if the determining step is negative, a response is sent back to the user, informing the user 570 that the component is not supporting one or more IT services. In this instance, if the component needed to be upgraded, the user would be able to perform the upgrade knowing that the upgrade would not impact any IT services.

Once it has been determined that the component is supporting one or more IT services, the data feed is further authenticated at step 535, a query is performed at step 540 in the data store 540 to determine if the IT service is active at the present time 545.

Alternatively, if the query finds that the IT service is not active 550, then a response informing the user that the IT service is not active is sent back to the user at step 570.

At step 555 the data feed is further authenticated and the impact assessor determines the severity of the failure of the component on the one or more identified IT services at step 560.

Once the impact assessor determines the impact of the failure of a component on one or more IT services, the response is built 570 and displayed in the schedular function 200 at step 575.

Figure 6:
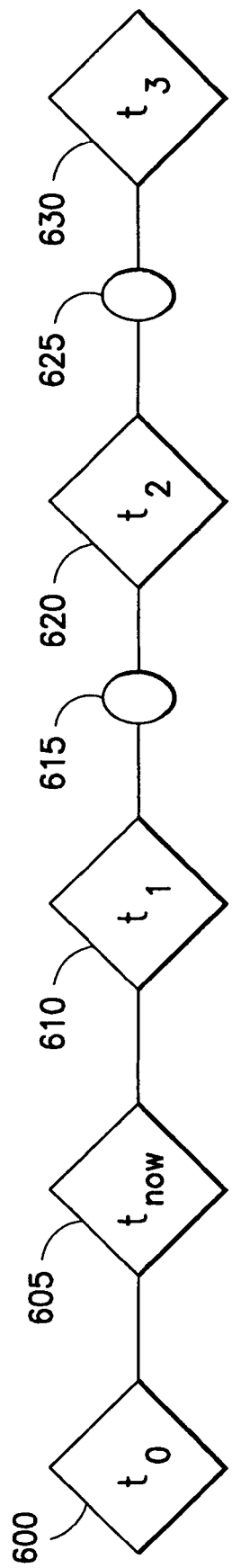
FIG. 6 is a timeline of an IT service which is affected by the failure of a component.

Referring to FIG. 6, a timeline illustrates the steps of determining the severity of the impact and calculating the overall recovery time for a component failure. At step 565, the impact assessor analyzes the gathered information obtained by steps 505 to 555 of FIG. 4.

The impact assessor begins by establishing the time (t0) 600 at which the data feed was received by the impact assessor, as this is the time that it is determined that the impact has failed. The impact assessor parses the data feed to locate a time stamp indicating the time the data feed was received by the authentication component and the time in which the component has failed.

There may be a time lapse between the time at which the component failed and the time in which a system operator is alerted to the failure of a component. Therefore a further time stamp is taken at the time a system operator acknowledges the component failure 605. The acknowledgement may take the form of an input button that signifies that the system operator has started to process the component failure.

Next, impact assessor 220 determines the latest time in which the failed component may be recovered (business recovery time (BRT)) 625. The BRT 625 indicates 'allowable interruption time' to an operational service from a single event. A query is performed within data store 135 to locate when the component must be running to support one or more IT services. For example, it may be recorded in data store 135 that a time recording process must be available for use at 15:00 pm on Friday (T2) 620.

A further lookup is performed in data store 135 to determine how long it will take to bring 'back on line' the failed component (predicted overall recovery time) 615. For example, if the component needed to be replaced, it could take 1 hour to carry out the upgrade and bring the processing node back on line.

Based on the variables defined above the impact assessor can calculate the business recovery time for any given component for one or more component failures. For example, using the example above, the latest time 610 in which a component must be recovered=T2−Predicted overall recovery time, i.e. the latest time a component must be recovered=15:00−60 mins=14:00.

A further calculation is performed to determine the latest possible time 630 that the service must be available i.e. the slack time in which to start repairs of the components. For example, T3=T2+BRT latest possible time the service must be available.

Again using the previous example, T3=14:00 (IT service start time)+120 mins=16:00 hours.

The above calculations are performed for each component failure in real time as the component failures are notified to the impact assessor.

The results of each of the above calculations produce a list of components and the time in which each of the components must be started. The list may be sorted in many ways, but in a preferred embodiment the list is sorted by recovery sequence.

The results of the calculations may result in groups of components for which recovery must be started at the same time. Within these groups, an order of recovery is determined. In a preferred embodiment the order of recovery is determined, for example, by the type of impact of a failure, for example, fatal, critical or available.

Within each of these categories, the order may be determined by whether or not the failure will have a downstream impact on other IT services or other components, or an indirect impact on other IT services. Thus, a failure of a component with a downstream dependency will take precedence over a failure of a component with no downstream dependency.

For example, the table below illustrates a number of impacts and their associated dependencies.

| Component | Impact | Dependency |
|---|---|---|
| Router | Fatal | Down stream |
| Disk drive | Fatal | No |
| Network adapter | Critical | Down stream |
| Memory failure | Critical | No |
| Router | Available | Down stream |
| Processor | Available | No |

There may also be a "recovery dependency hierarchy" for the affected components which will be factored into the sequence, within the above impacts. Recovery dependent components inherit the priority of their 'parents', and are placed one above the 'parent' in the sequenced list.

The output from the prioritization may be a display illustrating all the components that need to be recovered, along with the component's dependency information. A preferred sequence of display is in order of latest recovery time.

Logic is applied to sequence the recovery actions, within the overall prioritization given, taking into account tacit knowledge, availability of resources and (optionally) feedback from the affected customers, to determine the actual recovery plan.

The invention claimed is:

1. A method for determining the impact of a failure of a component for one or more services that the component is supporting, the method comprising the steps of:
   receiving a data feed from a processing node, the data feed comprising data indicative of an identity and system status of a component running on the processing node, wherein the system status of the component identifies whether the component has failed or is active, wherein the system status of the component identifies that the component has failed at a failure time, and wherein the method further comprises identifying the failed component in a table consisting of 3 rows and 3 columns, wherein the three rows consist of a first row, a second row, and a third row, wherein the 3 columns consist of a first column, a second column, and a third column, wherein all data in the 3 rows and the 3 columns pertain to the failure time, wherein the first column identifies components that have failed, wherein the second column identifies components impacted by the failed components in the first column, wherein the third column identifies components that are running but may be subsequently impacted by the failed components in the first column, wherein the first row identifies components that must run, wherein the second row identifies components that should run, wherein the third row identifies components that are not needed, wherein the failed component whose system status has been identified is listed in a cell of the table defined by the first column and a pertinent row selected from the group consisting of the first row and the second row, wherein an impacted component that is impacted by the failed component is listed in a cell of the table defined by the second column and the pertinent row, and wherein a running component that is running at the failure time and may be subsequently impacted by the failed component is listed in a cell of the table defined by the third column and the pertinent row;

mapping the one or more services into a calendar function;

first determining that the component supports the one or more services, wherein said first determining further comprises performing a lookup in the calendar function to identify a temporal activity and a level of criticality of each service of the one or more services, and wherein the temporal activity identified by the calendar function comprises for each service of the one or more services: (1) minutes of each day of each week of each year that each service should run or must run, and (2) a level of criticality associated with each service with respect to the minutes of each day of each week of each year that each service should run or must run;

after said first determining, second determining an impact of the system status of the component on the one or more services from analysis of the identified temporal activity and the identified level of criticality of the one or more services determined from said performing the lookup in the calendar function.

2. The method of claim 1, wherein the calendar function is represented in a table.

3. The method of claim 2, wherein the level of criticality of each service is color coded such that each different level of criticality is displayed in the table as a different color.

4. The method of claim 1, wherein said first determining has determined that the component supports a first service of the one or more services, wherein the data in the received data feed indicates that the component has the system status of having failed at a first time, wherein said second determining has determined from the identified temporal activity and the identified level of criticality of the first service that the system status of the component having failed at the first time does not affect the first service between the first time and a second time that is later than the first time and that the level of criticality of the first service at the second time is a critical level, and wherein the method further comprises:

displaying a first color between the first time and the second time until the second time is approached, said first color being indicative of the first service not being affected by the system status of the component having failed; and displaying a second color differing from the first color when the second time is approached, said second color being indicative of the first service having the level of criticality at the critical level and thus being affected at the critical level by the system status of the component having failed.

5. The method of claim 1, wherein said first determining has determined that the component supports a first service of the one or more services, wherein the data in the received data feed indicates that the component has the system status of having failed, wherein the impact on the first service due to the component having the system status of having failed results in a first impact on a first company and a second impact on a second company, and wherein the second impact differs from the first impact.

6. The method of claim 1, wherein a first service of the one or more services mapped into the calendar function is identified by the calendar function as comprising a first level of criticality during first identified minutes of each day of each week of each year, wherein a second service of the one or more services mapped into the calendar function is identified by the calendar function as comprising a second level of criticality during second identified minutes of each day of each week of each year, wherein the first level of criticality and the second level of criticality are different levels of criticality, and wherein the first identified minutes and the second identified minutes are not identical to each other.

7. The method of claim 6, wherein a third service of the one or more services mapped into the calendar function is identified by the calendar function as comprising the first level of criticality during third identified minutes of each day of each week of each year, wherein a fourth service of the one or more services mapped into the calendar function is identified by the calendar function as comprising the second level of criticality during fourth identified minutes of each day of each week of each year, and wherein the first identified minutes, the second identified minutes, the third identified minutes, and the fourth identified minutes are not identical to one another.

8. A method for determining the impact of a failure of a component for one or more services that the component is supporting, the method comprising the steps of:

receiving a data feed from a processing node, the data feed containing data indicative of the identity and system status of a component running on the processing node, wherein the system status of the component identifies that the component has failed at a failure time, and wherein the method further comprises identifying the failed component in a table consisting of 3 rows and 3 columns, wherein the three rows consist of a first row, a second row, and a third row, wherein the 3 columns consist of a first column, a second column, and a third column, wherein all data in the 3 rows and the 3 columns pertain to the failure time, wherein the first column identifies components that have failed, wherein the second column identifies components impacted by the failed components in the first column, wherein the third column identifies components that are running but may be subsequently impacted by the failed components in the first column, wherein the first row identifies components that must run, wherein the second row identifies components that should run, wherein the third row identifies components that are not needed, wherein the failed component whose system status has been identified is listed in a cell of the table defined by the first column and a pertinent row selected from the group consisting of the first row and the second row, wherein an impacted component that is impacted by the failed component is listed in a cell of the table defined by the second column and the pertinent row, and wherein a running component that is running at the failure time and may be subsequently impacted by the failed component is listed in a cell of the table defined by the third column and the pertinent row; and in response to the identity of the component, first determining if the component supports one or more services and if so, identifying the temporal activity of the one or more services and, in dependence on the first determining step, second determining the impact of the system status on the one or more services, wherein the system status of a component identifies whether the component has failed or is active, and wherein in response to identifying that a component has failed, determining the length of time that it will take to rectify the fault and the time in which the component must start to be recovered in order support a scheduled service.

9. A method as claimed in claim 8, wherein the result of the second determining step produces a list of results identifying each component that has failed and the time period in which each failed component must be recovered.

* * * * *